United States Patent [19]
Franet

[11] Patent Number: 5,873,229
[45] Date of Patent: Feb. 23, 1999

[54] COUPLING ARRANGEMENT

[75] Inventor: Roger Franet, Sarreguemines, France

[73] Assignee: Deere & Company, Moline, Ill.

[21] Appl. No.: 792,422

[22] Filed: Feb. 3, 1997

[30]     Foreign Application Priority Data

Mar. 6, 1996  [DE]  Germany .......................... 196 08 579.9

[51] Int. Cl.$^6$ ............................. A01D 34/03; A01B 59/00
[52] U.S. Cl. .......................... 56/15.7; 172/204; 280/492; 280/493
[58] Field of Search ..................................... 56/15.7, 14.9, 56/15.1, 15.2, 15.6, 15.9, DIG. 14; 172/450, 451, 605, 681, 677, 679, 204; 280/492, 493

[56]             References Cited

U.S. PATENT DOCUMENTS

| 1,913,039 | 6/1933 | Paul ......................................... 172/605 |
| 4,290,622 | 9/1981 | Horváth .................................. 280/492 |
| 4,838,015 | 6/1989 | Mouret et al. ............................ 56/15.7 |
| 5,025,616 | 6/1991 | Moss ........................................ 56/15.1 |

FOREIGN PATENT DOCUMENTS

| 0196427B1 | 8/1989 | European Pat. Off. . |
| 1144535 | 4/1957 | France ..................................... 56/15.9 |
| 4236166A1 | 4/1994 | Germany . |

*Primary Examiner*—Thomas B. Will
*Assistant Examiner*—Arpad Fabian Kovacs

[57]             ABSTRACT

A coupling arrangement includes an inverted u-shaped frame having opposite legs joined by a transverse bight portion. The lower draft links of a tractor three-point hitch are connected to lower ends of the legs of the frame for pivoting about a horizontal transverse axis. Located centrally between the frame legs along the bight portion of the frame is an angle member having a horizontal limb defining a first link and being joined to a vertical limb defined in part by an upwardly projecting bearing axle. An implement draft tongue includes a forward extension to which upwardly and downwardly projecting bearing axles are fixed along a vertical axis. The coupling arrangement includes a second link spaced vertically above the first link and having ball joints in its opposite ends respectively mounted to the bearing axle of the angle member and the upwardly projecting bearing axle of the draft tongue. A ball joint is mounted in the first link and is received on the downwardly projecting bearing axle of the draft tongue. Accordingly, the first and second links and the ball joints they carry act to transfer tensile and compressive loads between, and permit universal movement between, the implement and the tractor.

10 Claims, 4 Drawing Sheets

COUPLING ARRANGEMENT

BACKGROUND OF THE INVENTION

The invention concerns a coupling arrangement for a towed implement with a frame for a connection that can pivot vertically from and with respect to a towing vehicle and a component for the connection to the implement.

An European Patent Specification published on 23 Aug. 1989 under No. 196,427 reveals a mowing implement that can move on two wheels with a draft tongue that can be connected to an agricultural tractor through a coupling arrangement. On the side of the agricultural tractor, the coupling arrangement is connected only to the lower draft arms and hence can pivot vertically with respect to the agricultural tractor. On the side of the implement, a component is provided that contains two U-shaped connecting devices each of which has a pivot axis which permits a connection of the frame similar to that of an articulated shaft through the lower draft arms to the draft tongue. The coupling device that is connected to the frame, free to pivot vertically, is open downward, while the coupling device that is rigidly connected to and engages the forward end region of the draft tongue is open to the rear, where a first link above the drawbar and a second link below the drawbar each engage a pivot axis.

German Patent Application No. 42 36 166 published on 28 Apr. 1994, discloses a coupling arrangement that contains an attaching frame connected to the three-point hitch which can be attached through a ball coupling to a pivot axle on the underside of an implement draft tongue. This coupling arrangement requires a three-point implement hitch to be provided for attachment to a pair of lower draft links and an upper center link of a tractor three-point hitch.

SUMMARY OF THE INVENTION

According to the present invention, there is provided an improved coupling arrangement for attaching an implement to a towing vehicle in such a way that the implement may go through vertical, horizontal or a mixture of horizontal and vertical movements relative to the towing vehicle.

An object of the invention is to provide a coupling arrangement which requires only two points of connection, such as that afforded by a pair of draft links, with a towing vehicle.

A more specific object of the invention is to provide a coupling arrangement including first and second vertically spaced links extending between the coupling arrangement and the implement with one of the links

DESCRIPTION OF THE PREFERRED EMBODIMENT

Figure 1:
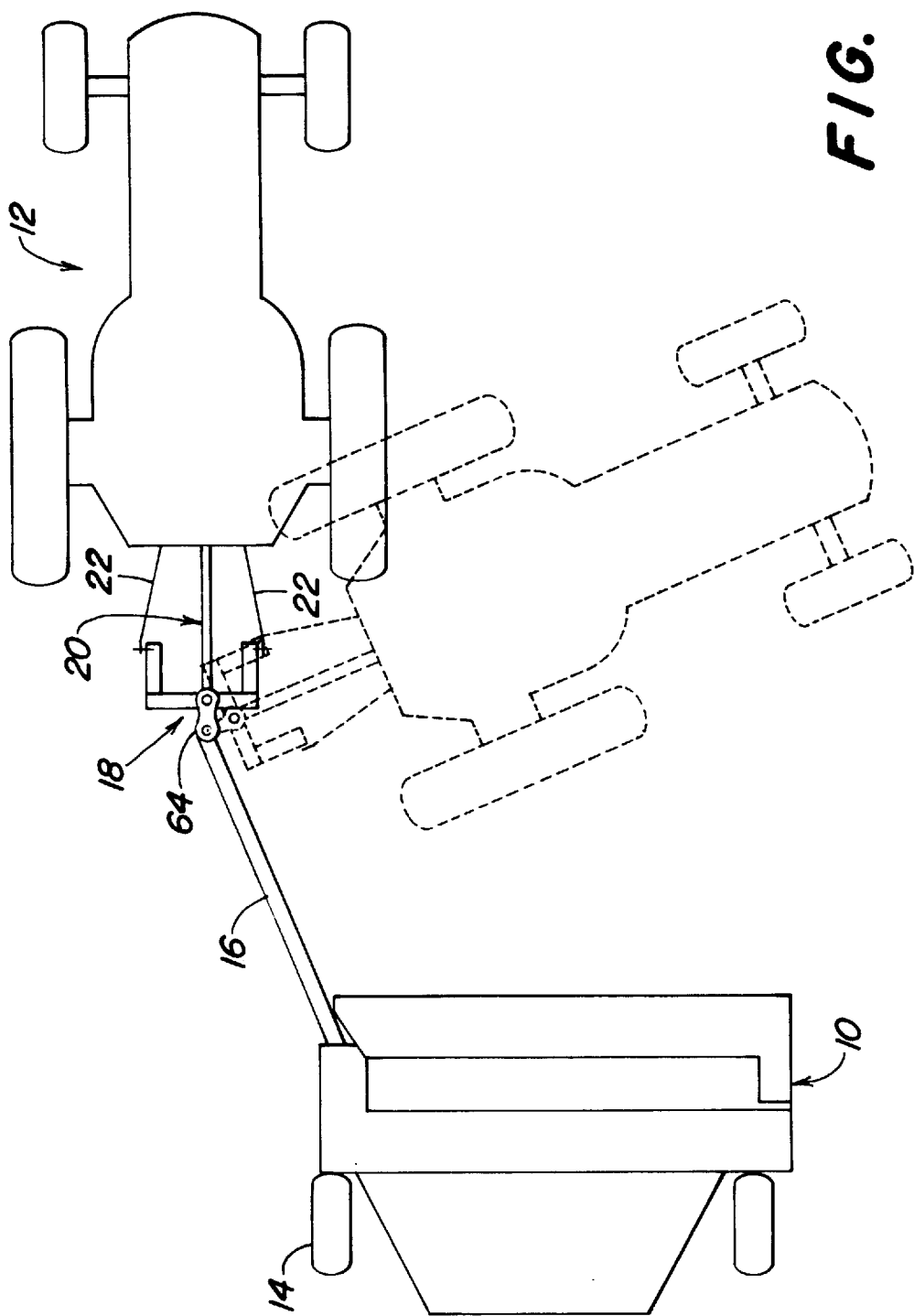
FIG. 1 is a schematic plan view of an implement and towing vehicle.

According to FIG. 1, an implement 10 is attached to a towing vehicle 12 and is thereby towed along behind the towing vehicle 12 during operation and transport.

The implement 10, while shown here configured as a mower, may also be configured as a forage harvester, hay recovery implement, baler, sprayer, ground breaking implement or the like and is not necessarily driven. The implement 10 includes a pair of ground support wheels 14 and a fore-and-aft extending draft tongue 16 having its forward end coupled to the towing vehicle 12 by a coupling arrangement 18 constructed in accordance with the present invention. If the implement 10 includes a driven component, an articulated power shaft 20 (see FIG. 2) is provided which transmits the drive from the towing vehicle 12 to the implement 10. As a rule, the towing vehicle 12 is an agricultural tractor with lower draft arms 22 which can be moved vertically, in a well known manner not shown here, in order to raise the front end of the draft tongue 16. In conventional implement couplings including the lower draft arms 22, an upper center arm is also provided. This arrangement however is not employed in this invention and is therefore not included in the drawing. Here the subject is a two-point implement hitch. To provide a drive for the implement 10, if required, the towing vehicle 12 is equipped in its rear region with a known power take-off shaft 72 to which the articulated power shaft 20 can be connected.

Finally, FIG. 1 reveals that the train composed of the towing vehicle 12 and the implement 10 can take on not only an extended straight-line position, but also an angled position as is the case when a curve is being negotiated.

Although it is not shown, it is nevertheless apparent that the implement 10 can roll about the longitudinal axis of the train as the train passes over uneven ground or that the coupling arrangement 18 can pivot vertically in the lower draft arms 22.

Figure 2:
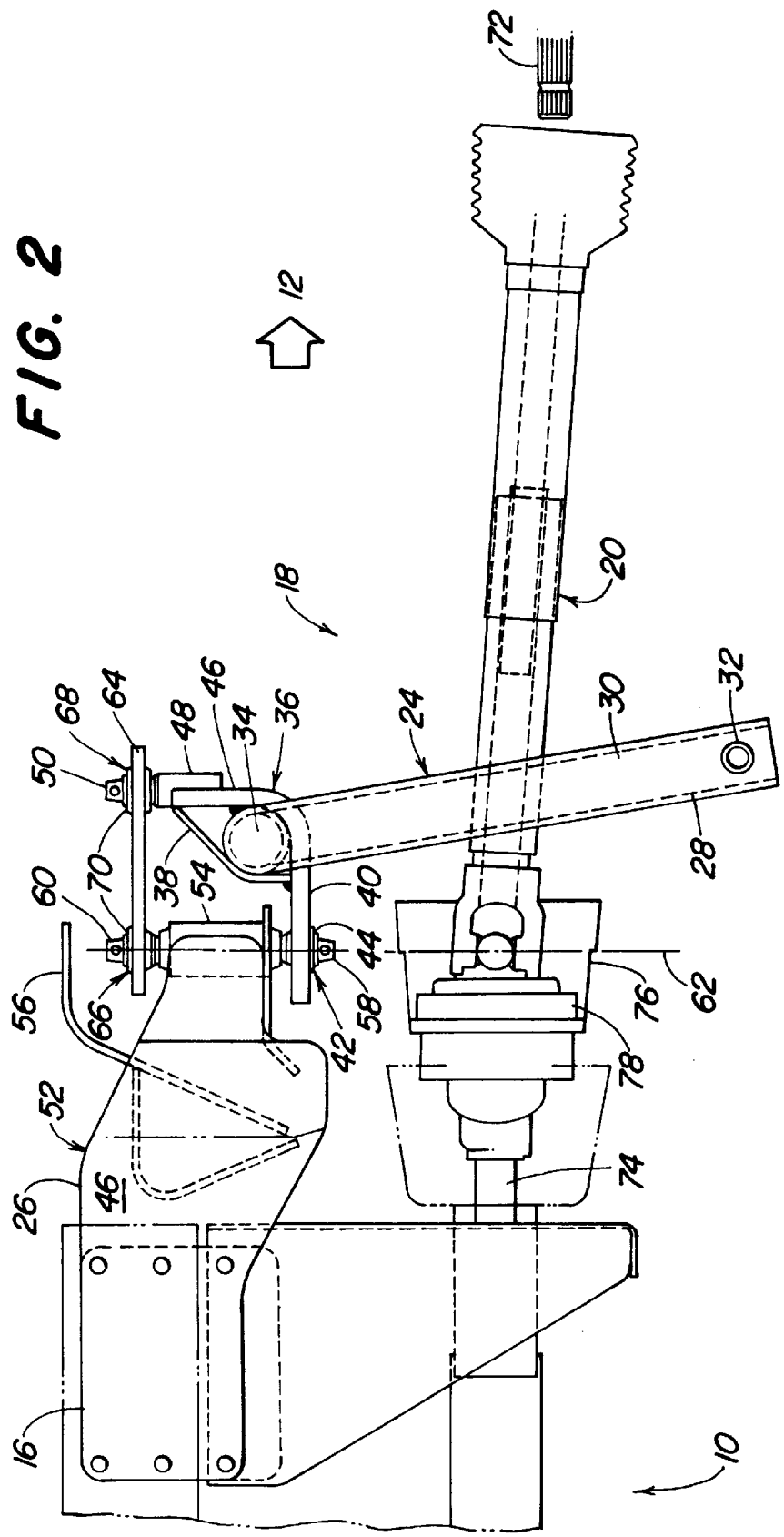
FIG. 2 shows a side view of a coupling arrangement, constructed according to the invention, connected between the implement and the towing vehicle.
Figure 3:
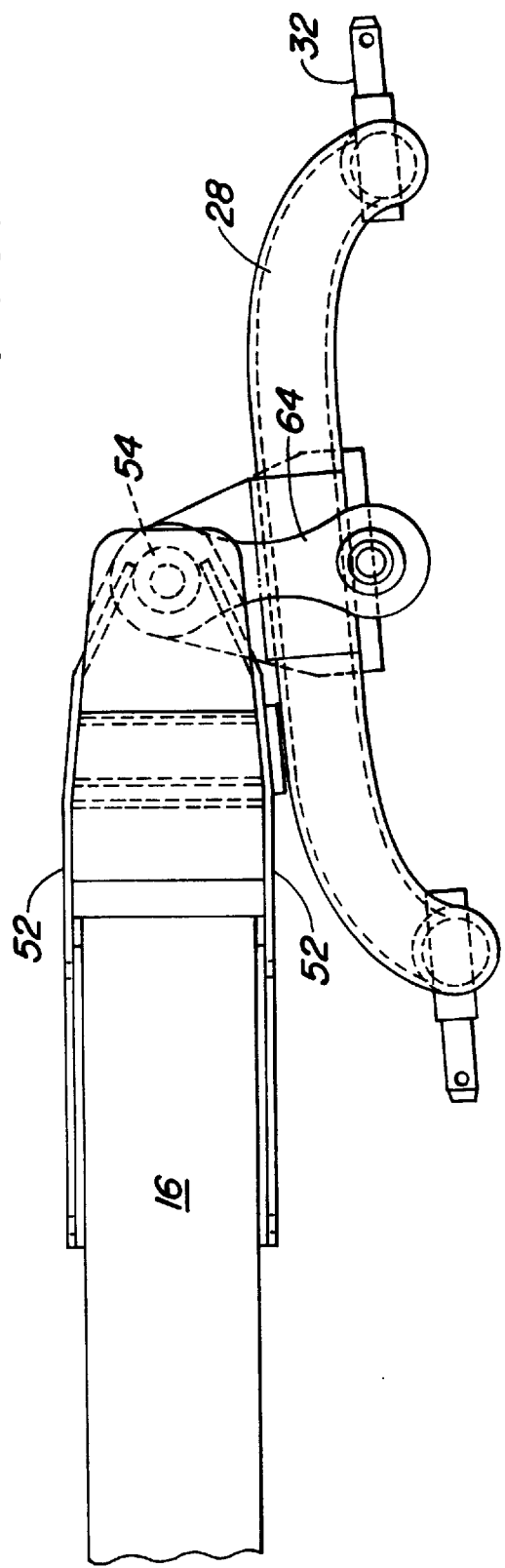
FIG. 3 is a plan view of the coupling arrangement.

Referring now also to FIGS. 2 and 3, it can be seen that the coupling arrangement 18 includes a frame 24 connected to a component 26, forming a forward end of the draft tongue 16, so as to pivot in several directions in a way described below. Specifically, the frame 24 includes a downwardly opening, U-shaped attaching member 28 including a pair of spaced apart legs 30 straddling the articulated drive shaft 20, if used, the legs being directed forwardly toward the towing vehicle 12 at a slight angle to the vertical. It is noted that in FIG. 2 the only portion of the towing vehicle shown is the power take off shaft 23 to which the forward end of the drive shaft 20 would be connected for transferring power to any component the implement 10 might have that needs to be driven. Horizontal pins 32 are mounted in lower regions of the legs 30 and are here shown as extending transversely outwardly relative to a vertical plane of symmetry of the attaching member 28 for attachment of the coupling arrangement 18 to the draft arms of the towing vehicle 12. It is noted that for some towing vehicles it might be desired to extend the pins 32 inwardly. The U-shaped attaching member 28 further includes a bight portion 34 extending between and joined to upper ends of the legs 30. Located midway between opposite ends of the bight portion 34 is an angled retainer 36 having gussets 38 located in its corner region and welded to the bight portion 34.

The angled retainer 36 is formed by bending a strong steel sheet to form a right-angled structure having a horizontal leg or limb defining a plate-shaped first link 40, the rear end of which contains a spherical bearing 42 formed by a ball 44 provided with a central opening and being retained in a pan in the link 40 so that it cannot be lost and can undergo universal pivoting. The angled retainer 36 further includes a vertical leg or limb in the form of a wall 46 to an upper central location of which is welded a vertically disposed cylindrical bushing 48 in which a shank-like bearing axle 50 is retained so as to preferably be fixed against rotation.

The component 26 consists of two vertical walls 52 respectively forming opposite, removable sides of a forward end of the draft tongue 16, the walls 52 having downwardly and forwardly tapered forward regions and being bent so as to have forwardly converging forward regions. Received between and welded to the converging forward ends of the walls 52 is a vertically oriented sleeve 54. Somewhat behind the sleeve 54, that is, offset to the left in FIG. 2, a sheet metal reinforcement 56 is welded to the inner sides of the walls 52 and extends in a roof-shape upwards over the sleeve 54 and is used among other purposes for the attachment of hydraulic and or electric lines, not shown. Bearing axles 58 and 60, respectively, project upwardly and downwardly from opposite ends of the sleeve 54 and, in their simplest form, are at opposite ends of a single pin retained in the sleeve 54 with a friction lock or a step so that they cannot be lost. At the ends extending from the sleeve, the bearing axles 58 and 60 are each penetrated by a cross bore into which a retaining cotter pin can be inserted, the pins not being shown for the sake of clarity. The two bearing axles 58 and 60 define a common vertical pivot axis 62, which represents the point about which the towing vehicle 12 pivots relative to the implement 10 when making turns.

A second link 64 is-cut from a steel plate and formed in this embodiment in the shape of an "8", and is respectively formed in front and rear end regions with spherical bearings 66 and 68 which each consist of a ball 70, retained in a pan secured in the link 64 from any possible loss, that affords universal pivoting motion. The horizontal distance between the bearings 66 and 68 corresponds to the horizontal distance between the bearing 42 and the bearing axle 50. Furthermore, the balls 70 of the bearings 66 and 68 are respectively mounted for engaging and freely rotating about the bearing axles 50 and 60.

It can be seen from FIG. 2 that the drive shaft 20 forms the connection between the power take-off shaft 72 on the towing vehicle 12 and a drive shaft 74 on the implement 10. In addition, it can be seen that the connection of the articulated shaft 20 to the drive shaft 74 is performed by a large-angle, universal joint 76, having a connecting disk 78 located between two universal joints and offset rearwardly from the pivot axis 62 by approximately 100mm.

Figure 4:
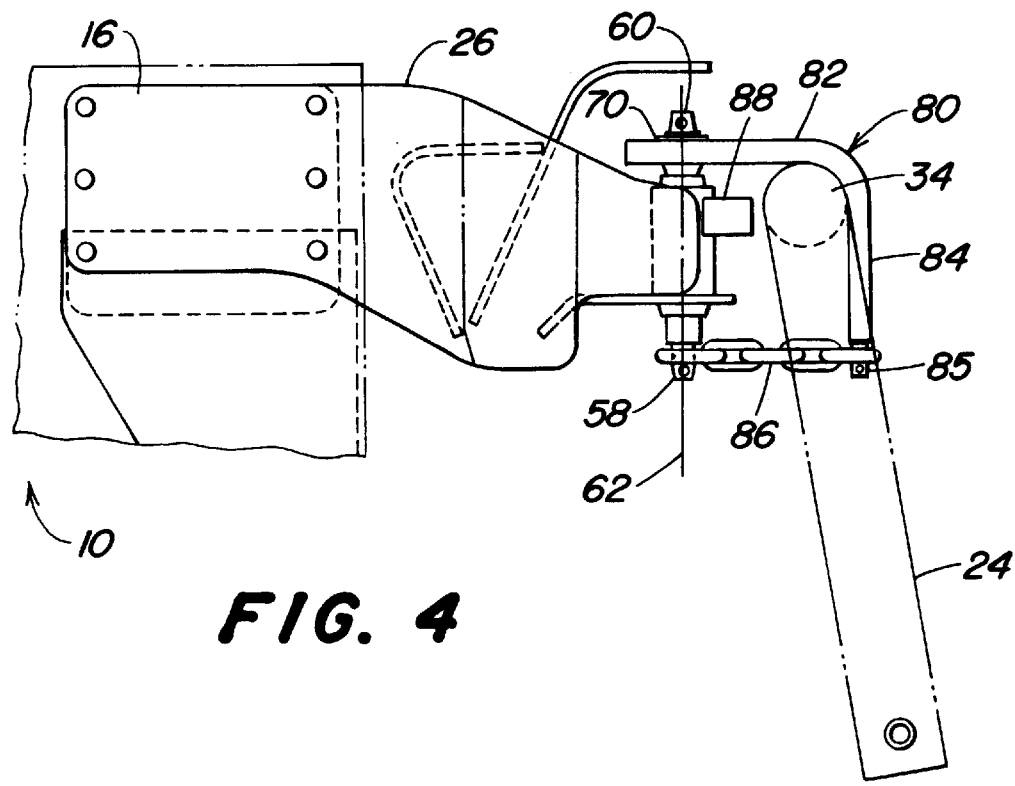
FIGS. 4 and 5 respectively show side views of first and second alternate embodiments of the coupling arrangement.

Referring now to the first alternate embodiment shown in FIG. 4, it can be seen that the frame 24 is connected to the draft tongue component 26 by a structure including an angled member 80 welded to the bight portion 34 of the frame 24 and having a horizontal link 82 universally coupled to the upper end of the axle 60 by the ball 70 which is mounted in a rear end of the link 82. The angle member 80 further includes a vertical leg 84 and coupled between pin 85 at a lower end of the leg 84 and the axle 58 is a flexible member shown here as a length of chain 86. A wire rope or cable having eyes formed at its opposite ends would work as well. A bumper structure 88 is formed cylindrically about the axis 62 defined by the axles 58 and 60 and is in close spatial relationship to the bight portion 34 of the frame 24 so that, when the towing vehicle 12 operates in reverse, force is transmitted from the frame 24 to the bumper structure 88 to cause reverse movement of the implement 10.

Figure 5:
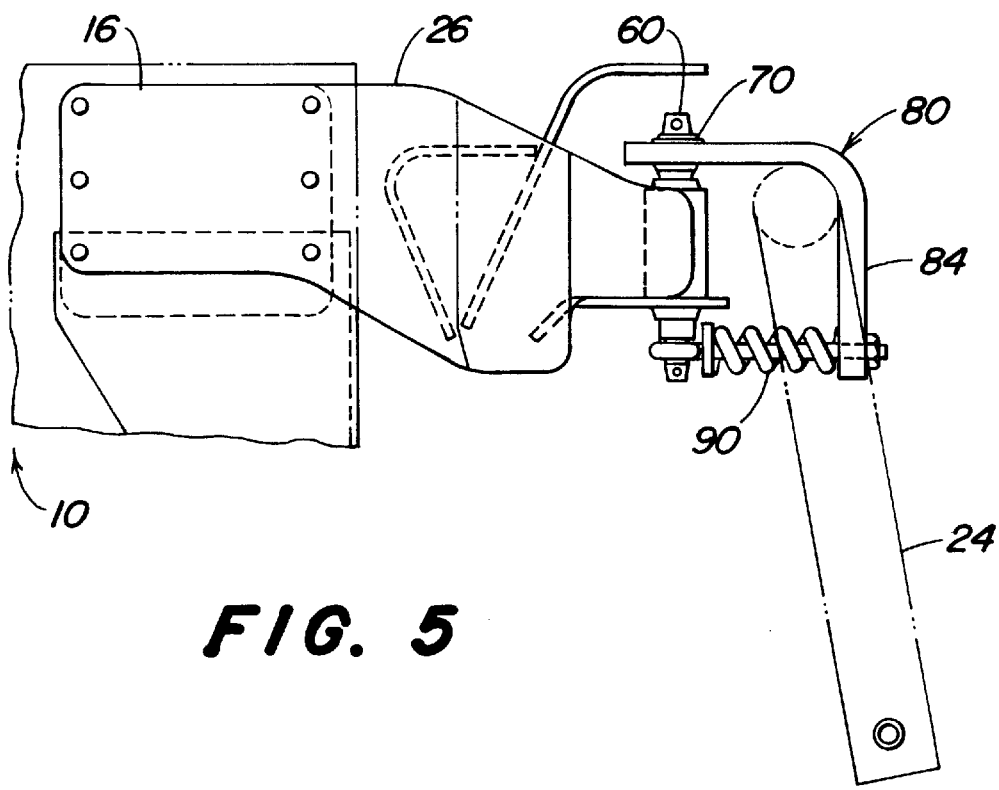

The second alternate embodiment shown in FIG. 5 also uses the angle member 80 but, instead of a flexible member being connected between the vertical leg 84 and the draft tongue component 26, heavy extension spring 90 is so coupled for transmitting tensile loads from the frame 24 to the implement tongue 16. However, in this embodiment there is no need for the bumper structure 88 since the spring 90 will become completely compressed and act as a solid link to transfer force from the frame 24 to the draft tongue 16 when the towing vehicle is operated in reverse.

OPERATION

During operation of the embodiment shown in FIGS. 2 and 3, tension loads are transmitted from the lower draft arms 22 through the frame 24 and the two links 40 and 64 to the component 26 and from there to the draft tongue 16. At the same time, the gravity force of the draft tongue 16 is absorbed by the lower link 40.

When the train composed of the towing vehicle 12 and implement 10 operates around a curve, the two links 40, and 64 perform a pivoting movement about the pivot axis 62.

In the case that the implement 10 pitches vertically relative to the vehicle 12, the pins 32 pivot in the lower draft arms 22, that is the frame 24 pitches vertically with respect to the towing vehicle 12.

If operation over uneven ground leads to the implement rolling about the longitudinal axis of the train with respect to the towing vehicle 12, the following movements occur. The frame 24 tilts with the link 40 about the ball 44 of the spherical bearing 42 in a plane transverse to the direction of travel. Simultaneously, the other link 64 pivots about the longitudinal axis established by the two bearings 66 and 68 in a generally horizontal plane. At that time, however, the end of the link 64 that is connected to the bearing axle 50 will move slightly downwardly. Accordingly, the connection of the frame 24 with the component 26 acts as a single universal joint.

It can be seen that the other link 64 is used in particular to support the frame 24 to restrain the latter from pivoting vertically about the ball 44 relative to the component 26. In the embodiment shown, this support is performed in compression since the connection point of the first link 40 is located below the forward end of the draft tongue component 26.

The first alternate embodiment illustrated in FIG. 4, operates such that the link 82 operates in compression to resist rearward forces exerted by the frame 24 as it tends to tilt toward the implement 10. On the other hand, the chain 86 operates in tension to transfer the pulling force of the towing vehicle to the draft tongue 16. When the towing vehicle is operated in reverse, the frame will 24 will pivot downwardly about the spherical bearing 70 carried for universal movement in the link 82. This pivoting of the frame 24 will bring the frame bight portion 34 into contact with the semi-cylindrical surface of the bumper member 88 with the result that a force will be transferred to the draft tongue 16 for causing the implement 10 to be moved in reverse.

The second alternate embodiment shown in FIG. 5 operates in a manner similar to that of the embodiment of FIG. 4 except that here the spring 90 works in tension to transfer a pulling force to the implement 10 and works once collapsed to its solid length, during reverse movement of the towing vehicle, to transfer a force to the implement 10 for causing the latter to move in reverse.

I claim:

1. In a combination of an towed implement having a forwardly extending draft tongue and a coupling arrangement for connecting the implement tongue to a towing vehicle, the improvement comprising: said draft tongue having a forward end supporting, an upwardly projecting first bearing axle and a downwardly projecting second bearing axle spaced below said first bearing axle; said coupling arrangement including a frame; said frame supporting a third bearing axle arranged parallel to said first and second bearing axles and located at a height approximating that of one of said first and second bearing axles; a first link being rigidly connected to said frame and being connected to the other of said first and second bearing axles for permitting horizontal and vertical pivotal movement of the frame and a second link connected to said one of said first and second bearing axles, and to said third bearing axle so as to pivot horizontally and vertically.

2. The combination defined in claim 1 wherein said second link is rigid in itself with its opposite ends respectively containing universal bearing members received on said first and third bearing axles; and said second link being located above said first link so as to act in compression to absorb forces resulting from the frame tilting towards the implement draft tongue.

3. The combination defined in claim 1 wherein said second link is located below said first link and is in the form of an inextensible flexible member.

4. The combination defined in claim 1 wherein said second link is located below said first link and is in the form of an extension spring.

5. The combination defined in claim 1 wherein said first link contains a universal bearing member received on said second bearing axle.

6. The combination defined in claim 1 wherein said first and second bearing axles are aligned with each other along an upright pivot axis.

7. The combination defined in claim 6 wherein said implement is a driven implement; an articulated drive shaft being provided for driving driven components of said implement; said drive shaft passing beneath said first and second bearing axles and including a large-angle universal joint constructed in the form of a disc located between front and rear universal joints; said disc being located rearwardly of said upright pivot axis with said front universal joint being located along said pivot axis.

8. The combination defined in claim 1 wherein said first and second bearing axles are formed integrally with opposite ends of a cylindrical pin so as to be of a one piece configuration; and said draft tongue forward end being defined by a fixed sleeve; and said cylindrical pin being secured in said sleeve.

9. The combination defined in claim 1 wherein said frame is of an inverted u-shape defined by a pair of substantially upright legs joined to and depending from a transverse bight portion; said first link forming one limb of an angle member having a second limb formed in part by said third bearing axle; and an area of said angle member where said limbs join each other being welded to said transverse bight portion at a location equidistant from said frame legs.

10. The combination defined in claim 9 wherein said one limb extends beneath said transverse bight portion and contains a spherical bearing received on said second bearing axle while said second limb extends forwardly of said bight portion; said second link containing spherical bearings in opposite ends thereof respectively received on said first and third bearing axles; and said first and second bearing axles being aligned with each other along an upright pivot axis.

* * * * *